United States Patent [19]
Varadan

[11] Patent Number: 5,494,401
[45] Date of Patent: Feb. 27, 1996

[54] ORIFICE MOTOR

[76] Inventor: Rajan Varadan, 6406 Wigwam Dr., Orangevale, Calif. 95662

[21] Appl. No.: 356,110

[22] Filed: Dec. 15, 1994

[51] Int. Cl.$^6$ ........................................................ F01D 1/18
[52] U.S. Cl. .............................. 415/80; 415/229; 415/230; 415/903
[58] Field of Search .................................. 415/63, 80, 81, 415/82, 198.1, 229, 230l, 903, 904; 175/107

[56] References Cited

U.S. PATENT DOCUMENTS

| | | | |
|---|---|---|---|
| 2,340,738 | 2/1944 | Dilley | 175/107 |
| 3,707,336 | 12/1972 | Theis, Jr. et al. | 415/904 |
| 3,858,668 | 1/1975 | Bell . | |
| 3,894,818 | 7/1975 | Tschirky | 175/107 |
| 4,031,971 | 6/1977 | Miller | 175/107 |
| 4,178,125 | 12/1979 | Dauvergne | 415/80 |
| 4,260,031 | 4/1981 | Jackson, Jr. . | |
| 4,260,167 | 4/1981 | Fox . | |
| 4,432,423 | 2/1984 | Lyons et al. | 415/903 |
| 4,440,242 | 4/1984 | Schmidt et al. | 415/903 |
| 4,546,836 | 10/1985 | Dennis et al. . | |

FOREIGN PATENT DOCUMENTS

| | | |
|---|---|---|
| 961026 | 1/1975 | Canada . |
| 697466 | 9/1940 | Germany . |
| 299176 | 4/1990 | U.S.S.R. . |
| 1109875 | 4/1968 | United Kingdom . |

OTHER PUBLICATIONS

Tiraspolsky, W., Hydraulic Downhole Drilling Motors, Gulf Publishing Company, 1985, pp. 27–32.

*Primary Examiner*—Edward K. Look
*Assistant Examiner*—James A. Larson
*Attorney, Agent, or Firm*—John P. O'Banion

[57] ABSTRACT

An orifice motor which includes a plurality of spaced-apart rotors positioned along a shaft and enclosed within a casing or housing. Each rotor includes at least one jet orifice thorugh which fluid passes and is ejected tangentially to the peripheral surface of the rotor. The apparatus also includes a high pressure fluid inlet at a first end of the shaft, and a plurality of exit ports together with an exit chamber at a second end of the shaft. Bearings and seals are employed to protect frictionally related surfaces. Fluid is injected into one end of the apparatus and travels axially through the apparatus, passing through each of the rotors by way of the orifices. As the fluid exits the orifices, a pinwheel effect is created which causes the rotors to spin, thus causing the attached shaft to spin. As fluid exits each rotor, it is introduced to the next rotor downstream, where it exits in the same way. The fluid pressure drops as it passes each successive rotor due to momentum imparted to the rotors by the fluid. The apparatus may include a bearing assembly which acts to transfer the weight of a drill string to the shaft of the motor, thereby reducing the load upon and increasing the life of the bearings.

18 Claims, 7 Drawing Sheets

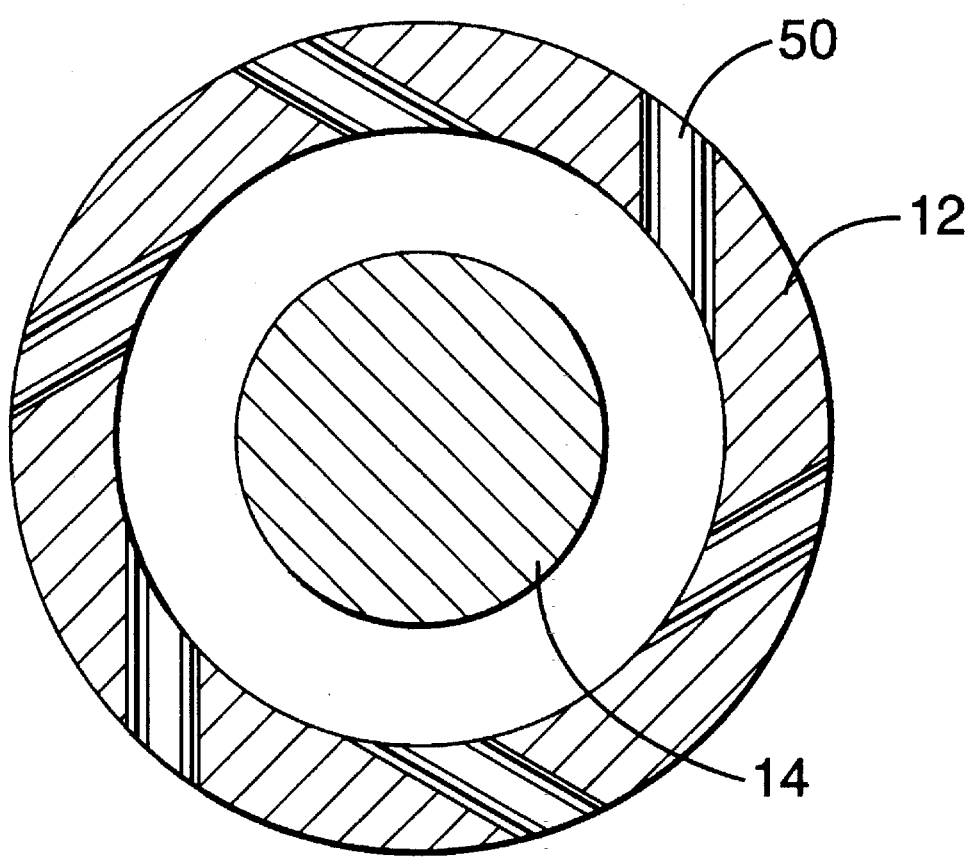
FIG. − 2

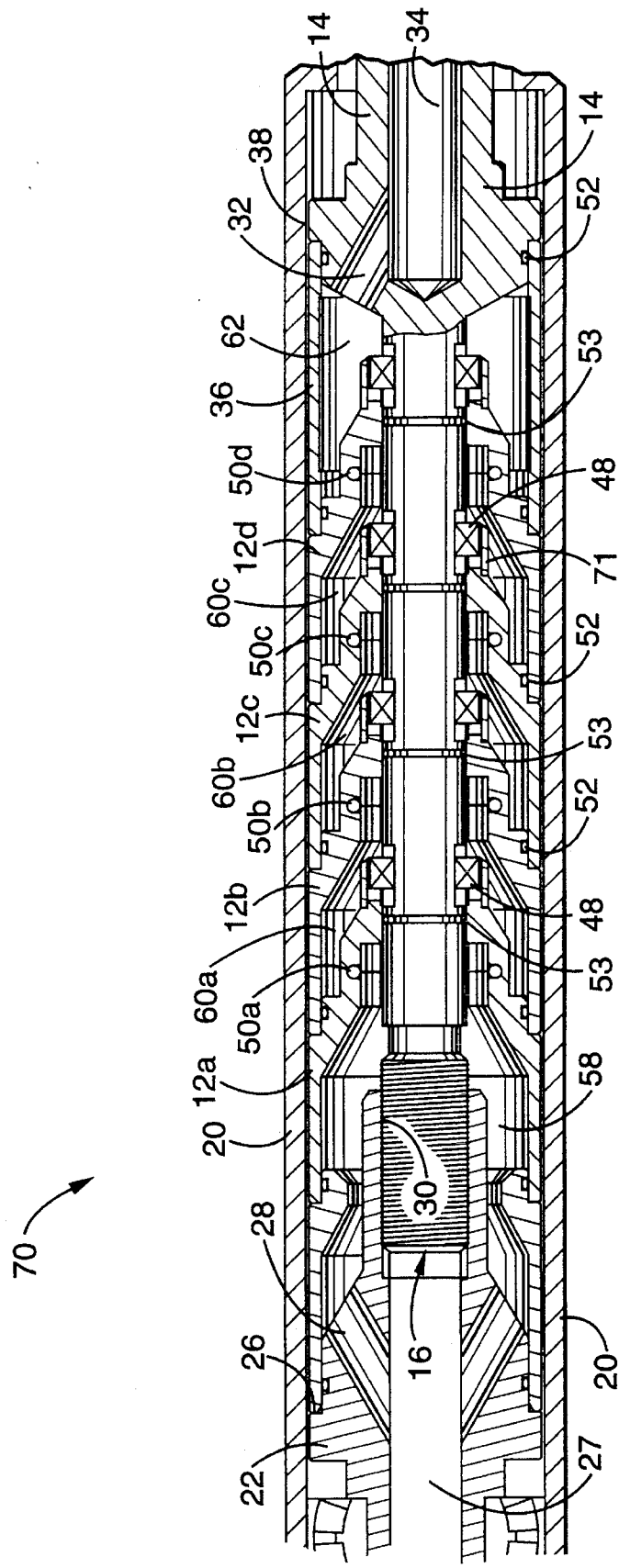
FIG. — 3B

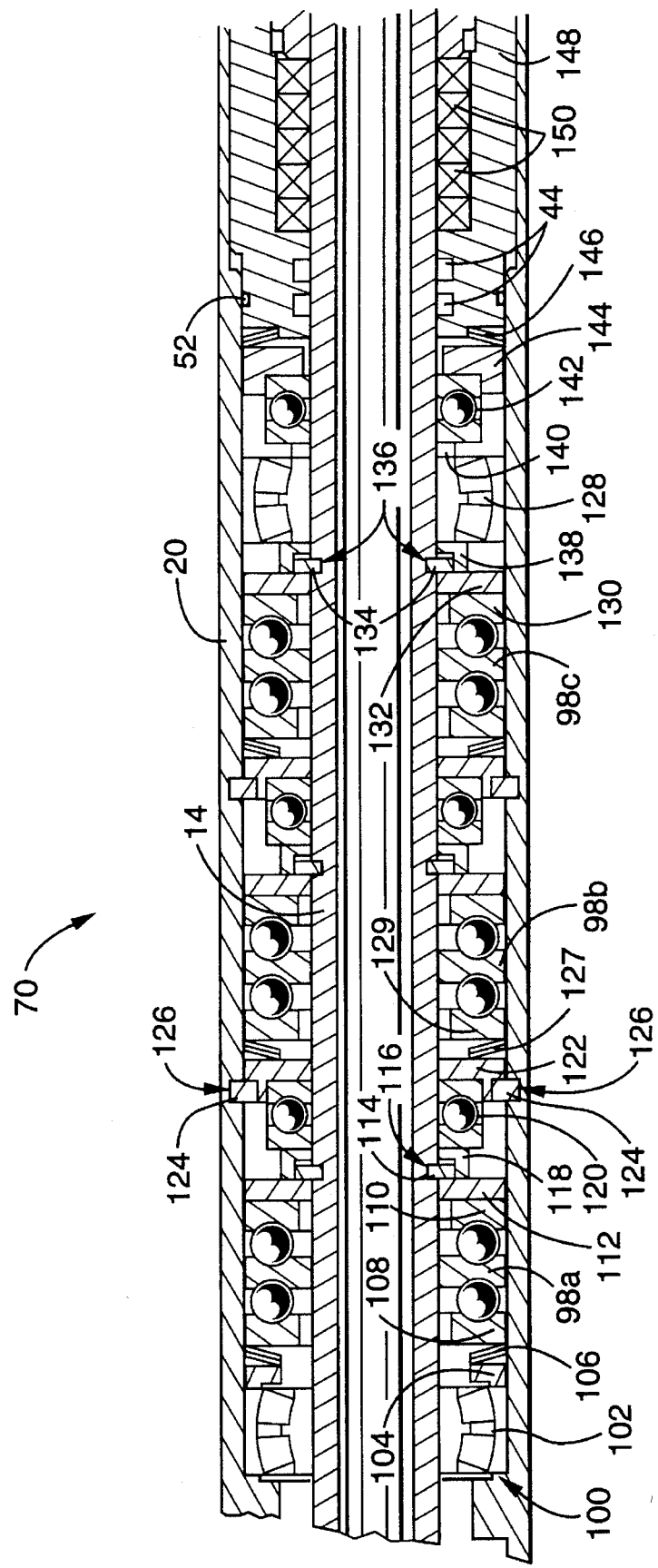
FIG. — 3C

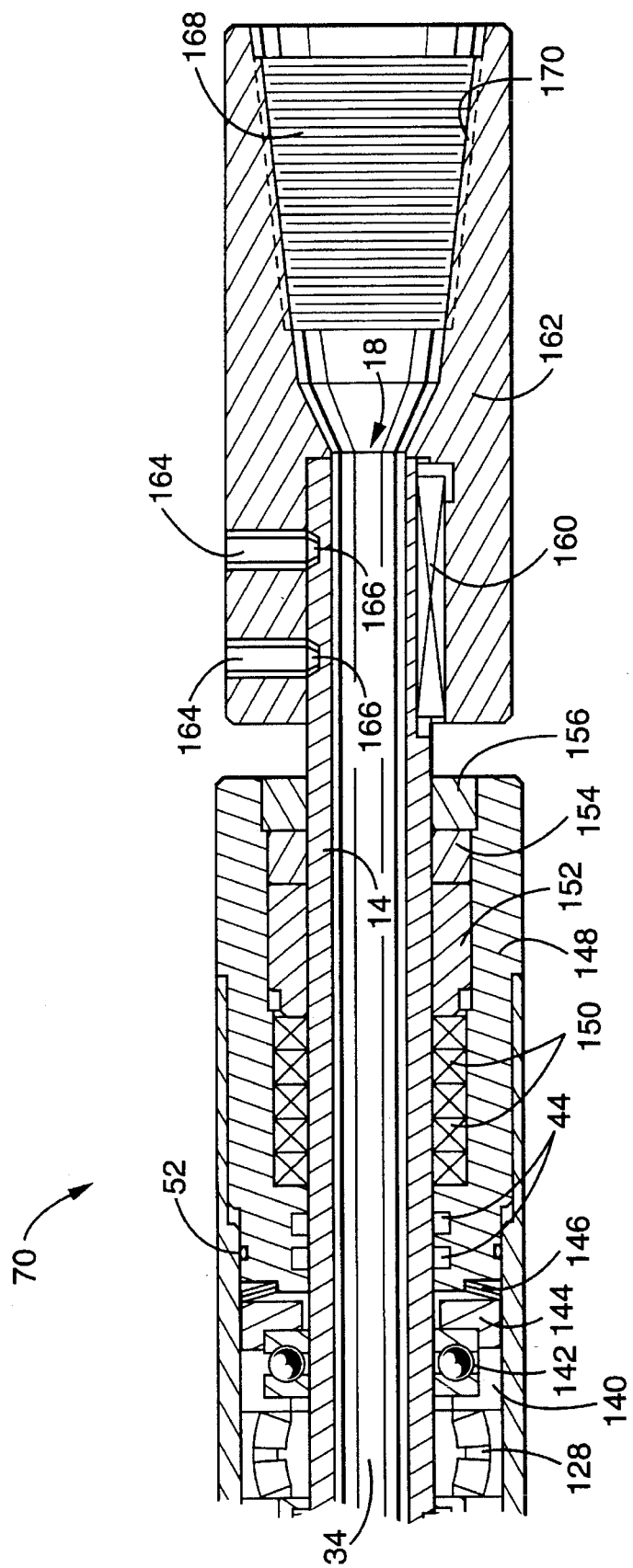
FIG.—3D 5,494,401

ORIFICE MOTOR

BACKGROUND OF THE INVENTION

1. Field of the Invention

This invention pertains generally to hydraulic motors, and more particularly to an orifice motor for use as a down hole motor in association with a drill string for drilling wells.

2. Description of the Background Art

Hydraulic motors are widely used in many industrial applications, including downhole motors for oil, gas, and water well drilling. Generally, hydraulic downhole motors are of the turbine and progressing cavity or Moineau types, although vane type motors may also be used. These motors are typically powered by high pressure fluids introduced to the motor from the surface through a drill string. After exiting the motor, the fluid can be directed to the drill bit to aid in displacement and removal of particulate debris loosened by action of the drill bit. Electric motors have occasionally been used in downhole applications, but suffer problems associated with the substantial lengths of insulated conductors and remote electrical connections involved.

A variety of hydraulic motors have been previously developed. For example, U.S. Pat. No. 4,260,167 discloses a well drilling tool having a shaft rotationally related to a casing, each of which includes a plurality of rotors in a turbine section. As fluid is forced through the rotors, the shaft is driven.

U.S. Pat. No. 3,971,450 discloses a turbodrill having turbine blades included on a casing and a shaft which rotationally driven by fluids passing through.

German Patent No. 697,466 discloses a compressed air drill-hammer having a rotor that emits compressed gas at an angle, thereby imparting hammer motion and rotational motion to a shaft.

Canadian Patent No. 961,026 discloses a turbodrill having multiple rotors through which fluid passes for rotational motion. The rotor angles can be varied to provide hydrodynamic braking. U.S.S.R. Inventor Certificate No. 299,176 discloses the same turbodrill.

British Patent No. 1,109,875 discloses a hydraulic turbine for bore hole drilling having a sleeve and a shaft which each have turbine blades. When fluid passes through the turbine blades, rotational motion is provided to the shaft.

As can be seen therefore, several hydraulic motors for drilling purposes have been devised. However, currently available hydraulic downhole motors experience drawbacks which require frequent and expensive repair, resulting in lost time on drilling rigs. Particularly, high operating temperatures due to internal friction as well as use in high temperature wells leads to increased wear and failure of dynamic elastomeric parts within the motors. Progressing cavity or Moineau-design hydraulic motors are perhaps the most susceptible to heat related failure due to the substantial amounts of elastomeric material in the stator portion of the motor which are subjected to dynamic forces.

Therefore, there is a need for a hydraulic motor which is resistant to wear and failure at high operating temperatures, and which does not require frequent repair. The present invention satisfies these needs, as well as others, and overcomes the deficiencies found in existing hydraulic motors.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains to an orifice motor which is simple, compact in design, provides for reduced amounts of wear, and is compatible with high use temperatures. The orifice motor disclosed herein utilizes an impulse momentum principle, creating linear impulse by changing the linear momentum of an input fluid. The impulse is then converted to torque. The impulse force and hence the torque which acts upon the rotor are a function of the rate of inlet of the fluid and the fluid specific weight.

In general terms, the apparatus comprising the invention includes a plurality of rotors about a shaft, the shaft and rotors enclosed within a casing or housing. Each rotor includes at least one jet or orifice.

By way of example and not of limitation, a plurality of orifices or jets are spaced radially about each rotor, with each orifice generally offset at an angle relative to a reference line which is orthogonal to the longitudinal axis through the rotor. The invention includes fluid input means at a first end of the shaft, preferably in the form of a fluid inlet nozzle. Fluid exit means are included at a second end of the shaft, preferably in the form of exit ports together with an exit chamber. Suitable sealing means and friction reducing means are employed to protect frictionally related surfaces.

In an alternative embodiment, means for supporting the weight of a drill string is included with the present invention, preferably in the form of a plurality of thrust bearings which are arranged to transfer the weight of the drill string to the shaft of the motor. This transfer of weight to the shaft reduces the load upon the bearing assembly included with the shaft, thereby increasing the lifetime of the bearings and reducing frequency of repair and replacement.

The invention is operated by injecting fluid into one end of the apparatus, with the fluid traveling axially through the apparatus, passing through each of the rotors by way of the jets or orifices, with the fluid exiting the orifices tangential to the rotors. As the fluid exits the orifices, a "pinwheel" effect is created which causes the rotors to spin, thus causing the attached shaft to spin. As fluid exits each rotor via the orifices, it is introduced to the next rotor downstream, where it exits in the same way. The fluid pressure drops as it passes each successive rotor due to momentum imparted to the rotors by the fluid. The fluid exits the apparatus via an exit chamber, and may be directed towards the drill bit to aid in the drilling process.

An object of the invention is to provide an orifice motor for generation of torque which requires no dynamic elastomeric components and thus experiences less wear and failure at high operating temperatures.

Another object of the invention is to provide an orifice motor in which the bearing pack can be integrated into the motor assembly, thereby reducing the cost and the length of the motor.

Another object of the invention is to provide an orifice motor which is compact in length and can thus be used in short radius holes.

Another object of the invention is to provide an orifice motor in which the output shaft rotates on center, without the orbital motion associated with progressing cavity pumps, thereby eliminating the need for universal joints for power transmission.

Another object of the invention is to provide an orifice motor in which the thrust load resulting from the input fluid can be controlled and reduced by angling of the orifices relative to a reference line which is orthogonal to the longitudinal axis through the rotor..

Another object of the invention is to provide an orifice motor in which the weight of the drill string is transferred to the shaft of the motor.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The invention will be more fully understood by reference to the following drawings which are for illustrative purposes only:

FIG. 2 is a cross-sectional view of the apparatus shown in FIG. 1A and 1B taken through line 2—2.

DETAILED DESCRIPTION OF THE PREFERRED EMBODIMENTS

Figure 1A:
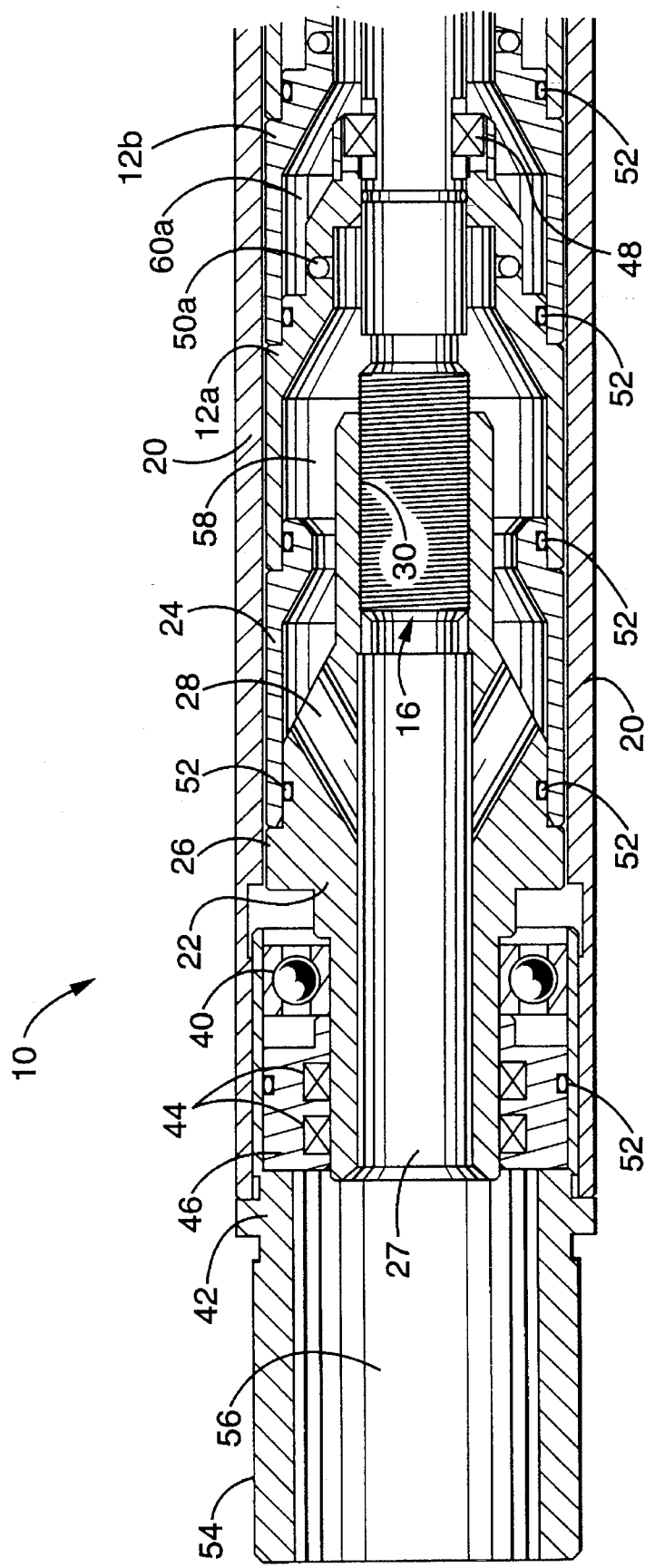
FIG. 1A and FIG. 1B show a longitudinal sectional view of an orifice motor assembly in accordance with the present invention.

Referring more specifically to the drawings, for illustrative purposes the present invention is embodied in the apparatus which is generally shown in FIG. 1 through FIG. 3, where like reference numerals denote like parts. It will be appreciated that the apparatus may vary as to configuration and as to details of the parts without departing from the basic concepts as disclosed herein.

Figure 1B:
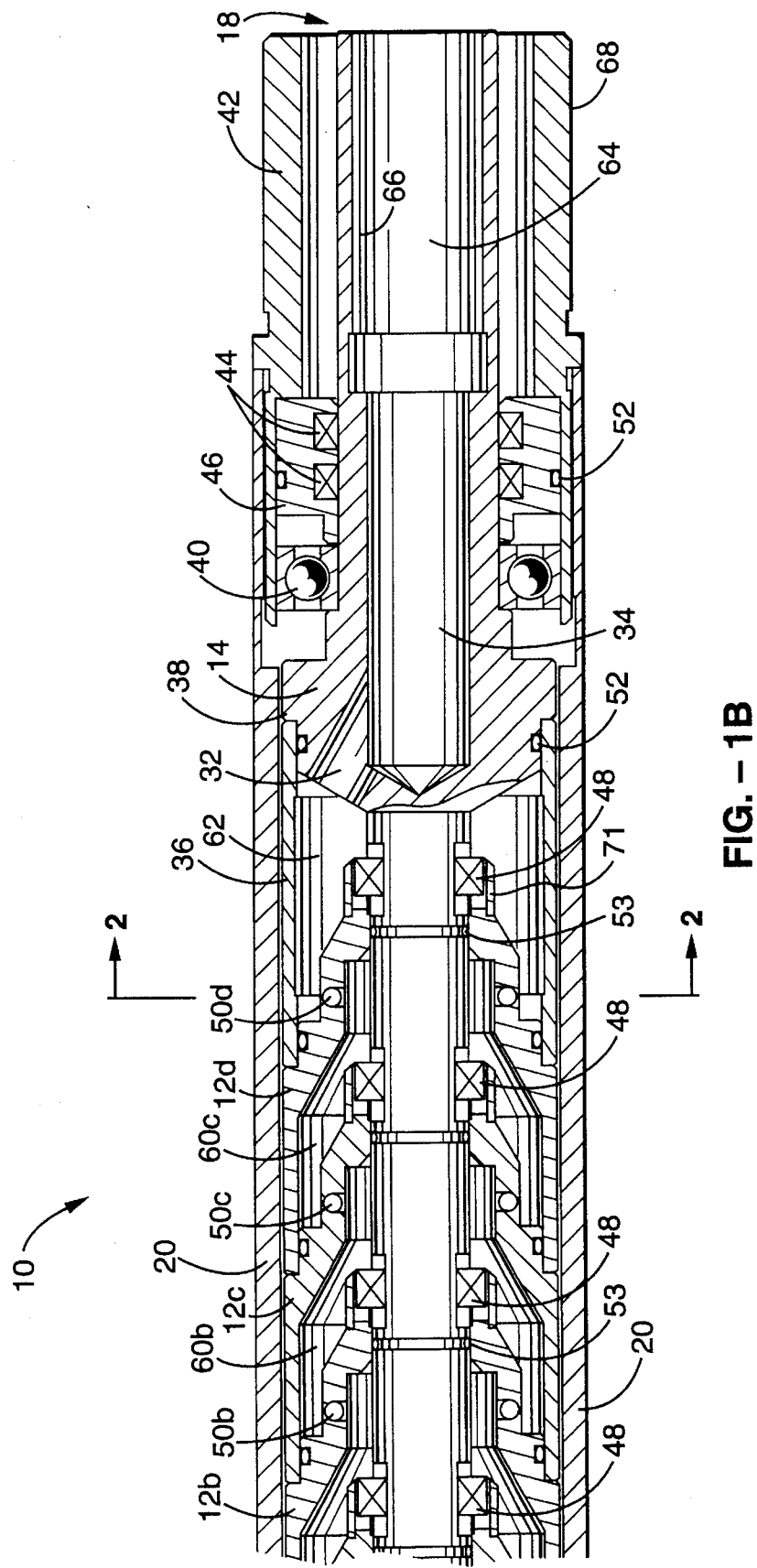

Referring first to FIG. 1A, FIG. 1B, and FIG. 2, an orifice motor 10 in accordance with the present invention is shown. A plurality of rotors 12 are included on a longitudinal shaft 14. Shaft 14 includes a first end 16 and a second end 18. Rotors 12 and shaft 14 are rotatably mounted within a housing or casing 20 which is preferably cylindrical in shape.

Fluid inlet means, preferably in the form of an inlet nozzle 22, is included adjacent shaft first end 16. Inlet spacer 24 is seated against a shoulder 26 on inlet nozzle 22, holding rotors 12 in position axially along shaft 14. Inlet nozzle 22 further includes an inlet bore 27. Inlet ports 28 communicate with bore 27 to allow fluid access to rotors 12, so that rotors 12 are generally in flow communication with the fluid inlet nozzle 22. Inlet nozzle 22 preferably attaches to shaft first end 16 by means of threads 30. It is also contemplated that inlet nozzle 22 could be an integral part of shaft 14.

Fluid outlet means are included at shaft second end 18, preferably in the form of exit ports 32 which communicate with an exit chamber 34 in shaft second end 18. A detachable fluid outlet nozzle is also contemplated. Exit spacer 36, which rests against shoulder 38 in shaft 14, holds rotors 12 axially in position along shaft 14. Exit ports 32 and exit chamber 34 are in flow communication with the fluid inlet means and rotors 12, so that fluid entering the motor 10 through nozzle 22 will pass through rotors 12 as described below, and ultimately exit motor 10 via exit chamber 34.

Friction reducing means are included in orifice motor 10, preferably in the form of a plurality of bearings 40 housed within bearing carriers 42 adjacent shaft first and second ends 16, 18. As shown, bearing carriers 42 are generally cylindrical in shape and conform to the overall shape of housing 20, and attach to housing 20 by threading or other suitable attachment means (not shown) so that bearing carriers 42 serve as cylindrical extensions of housing 20. Bearings 40 are protected from fluids and fluid born contaminants by sealing means, preferably in the form of a plurality of seals 44. Seals 44 are contained in seal housings 46, with seal housings 46 being adjacent to bearing carriers 42.

Rotors 12 are fixedly coupled to shaft 14, preferably by means of keys 48 which are held in place by retainers 71. Each rotor 12 includes at least one jet or orifice 50 located along the circumference of the rotor 12. Rotors 12 are structured and configured to form a close fit with housing 20.

As shown in FIG. 2, a plurality of orifices 50 are arranged about rotors 12 in a "pinwheel" configuration. Fluid which passes through orifices 50 is ejected tangentially to the circumferential surface of the rotors in a "pinwheel" like manner, causing the rotors to turn. Note that in the preferred embodiment there are six orifices 50 which are spaced apart in increments of approximately sixty degrees rotation, although spacings between approximately twenty degrees and one hundred and eighty degrees of rotation are acceptable, depending upon the number of orifices and their arrangement about the rotors 12. Further, note that orifices 50 are not simply positioned radially in relation to the central axis of the rotors. Instead, orifices 50 are offset at an angle between approximately five degrees and eighty five degrees in relation to a reference line which is orthogonal to the longitudinal axis through the rotor. In other words, the reference line is the radius line of a circle which is coplanar with the face of the rotor. As shown in FIG. 2, orifices 50 in the preferred embodiment are offset at an angle of about thirty five to forty five degrees relative to the reference line which is orthogonal to the longitudinal axis through the rotor. However, many offset angles for orifices 50 are contemplated for use with the present invention.

Means for preventing pressurized fluid from by-passing the rotors 12, preferably in the form of a plurality of O-rings or gaskets 52, are included at strategic locations within orifice motor 10. O-rings 52 between inlet spacer 24 and inlet nozzle 22, between outlet spacer 36 and shaft 14, and between rotors 12, prevent fluid from escaping along the housing 18. Additional O-rings 52 are included between bearing carriers 42 and seal housings 46 to further prevent pressurized fluid from seeping into bearings 40. O-rings 53 are positioned between rotors 12 along shaft 14 to prevent fluid from escaping along shaft 14.

In operation, orifice motor 10 is associated with a well drill string (not shown) which attaches to motor 10 preferably by threads 54 on bearing carriers 42. Pressurized fluid is introduced to orifice motor 10 through the well drill string, entering at input chamber 56 in bearing carrier 42. The pressurized fluid then travels through bore 27 in input nozzle 22 and through inlet ports 28. From inlet ports 28, fluid passes into a cavity 58 adjacent to rotor 12a. Cavity 58 generally extends from inlet ports 28 to rotor 12a, and provides fluid flow communication between inlet ports and rotor 12a. The pressurized fluid in cavity 58 is then forced through the orifices 50*a* of the first rotor 12*a*, travelling to chamber 60*a* between rotor 12*a* and rotor 12*b*. The fluid is next forced through the orifices 50*b*, and into chamber 60*b*, and so on, until the fluid has passed through each of the rotors 12 and chambers 60 in orifice motor 10. Ultimately, the fluid passes through orifice 50*d* in the last rotor 12*d* and reaches cavity 62, from which the fluid travels out through exit ports 32 into exit chamber 34. The fluid can then be directed towards the drill bit by suitable means (not shown), where the fluid can aid in loosening and moving material adjacent to the drill bit.. Preferably, shaft second end 18 includes a bore 64 with threads 66 allowing attachment to a drill sub and drill bit or additional bearing assembly (not shown). Threads 68 provide further attachment means for additional sealing arrangements. Fluid exiting cavity 62 passes through bore 64 as it exits the motor 10.

The pressurized fluid travels axially along orifice motor 10 except where the fluid passes through the orifices 50. This change of path in the fluid travel as fluid is ejected tangentially from rotors 12 and the resultant exit velocity of the fluid creates an impulse force at the axes of the orifices 50 of the rotors 12. The angular offset of the orifices 50 relative to the aforementioned reference line causes the impulse forces to create a torque that acts on the rotors, causing the rotors and attached shaft 14 to rotate.

The input fluid pressure drops as it passes through the orifices 50 of each successive rotor 12. The amount of pressure drop can be calculated using Bernoulli's theorem. With known fluid specific weight and known fluid input rate, a known amount of torque can be created for a series of rotors mounted to a shaft. Note also that, by altering the offset angle of orifices 50, the thrust load from the input fluid can be controlled.

Referring now to FIG. 3A through FIG. 3D, an alternative embodiment 70 of the present invention is shown, wherein like reference numerals denote like parts. As in the first embodiment related above, a plurality of rotors 12 are included on shaft 14 by keys 48. Inlet spacer 24 rests against shoulder 26 of inlet nozzle 22, and exit spacer 36 rests against shoulder 38 on shaft 14, holding rotors 12 in place. Inlet nozzle 22 is shown as attached to shaft first end 16 by threads 30. Rotors 12 are fixedly coupled to shaft 14 by keys 48. Retainers 71 hold keys 48 in place.

Friction reducing means, preferably in the form of self aligning bearing 72, is mounted between inlet nozzle 22 and housing 20. Friction reducing means preferably also include thrust bearings 74 which are mounted within carrier 76, and separated from bearing 72 by a spacer 78. Disc springs 80 are included between carrier 76 and an adapter 82, the disc springs 80 providing a small axial force on thrust bearings 74. Adapter 82 attaches to housing 20 by threads 84, and prevents unwanted movement by inlet nozzle 22. Adapter 82 attaches to a well drill string (not shown) by suitable attachment means such as threads 86.

A plurality of packing rings 88 are mounted between adapter 82 and inlet nozzle 22, and are held in place by packing gland 90. Pac-king gland 90 is coupled to adapter 82 by threads 92, and can be tightened to a predetermined torque and locked in place by lock nut 94. An elastomeric seal 96 prevents larger particulate contaminants from reaching packing rings 88. Seals 44 prevent any leakage from the packing rings from reaching any bearings.

A plurality of O-rings or gaskets 52, are included at strategic locations within orifice motor 10 to prevent fluid leakage. O-rings 52 between adapter 82 and housing 20, between outlet spacer 36 and shaft 14, between inlet nozzle 22 and inlet spacer 24, and between rotors 12, prevent fluid from escaping along the housing 18. O-rings 53 are also positioned between rotors 12 along shaft 14 to prevent fluid from escaping along shaft 14.

Figure 3A:
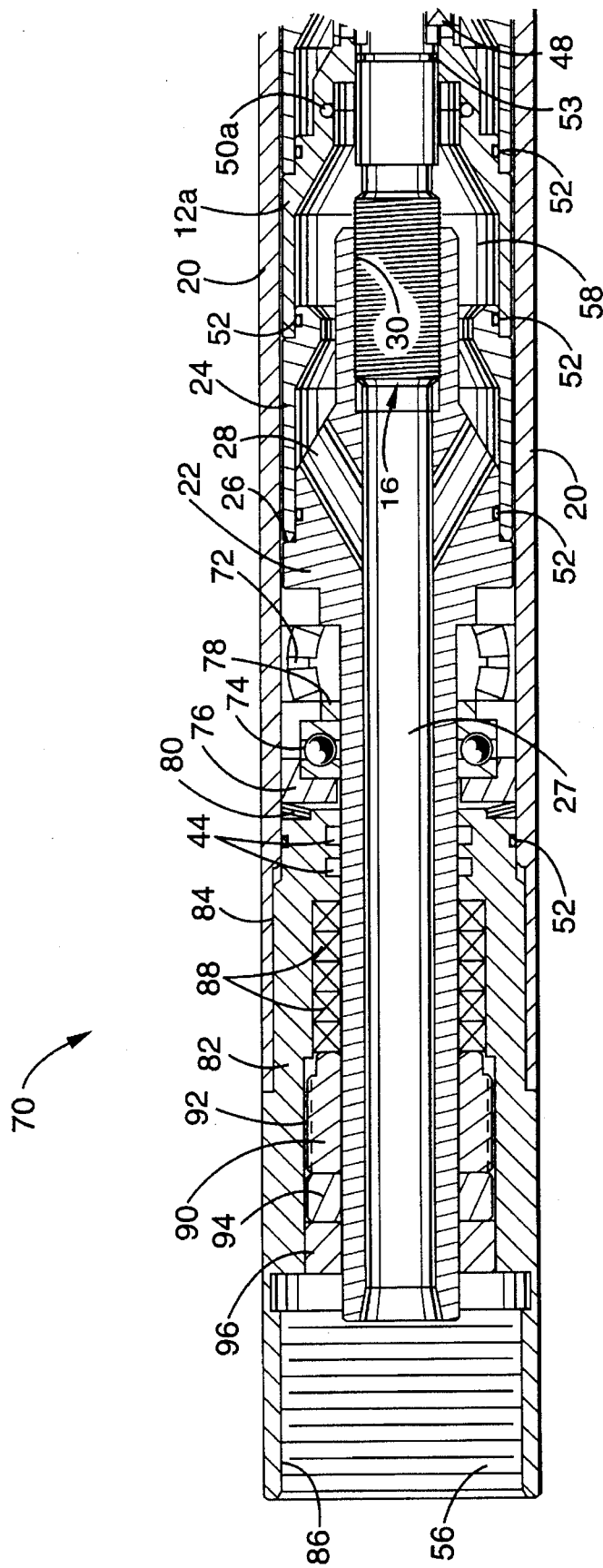
FIG. 3A thorugh FIG. 3D show a longitudinal sectional view of an alternative embodiment of an orifice motor assembly in accordance with the present invention that includes a bearing assembly designed to support a drill string.

In the alternative embodiment of the invention shown in FIG. 3A through FIG. 3D, a bearing assembly comprising a plurality of double acting thrust bearings 98 is included between shaft 14 and housing 20. This preferred arrangement of double acting thrust bearings 98, together with the spacers described below, serves as means for supporting the weight of a drill string by transmitting the weight of the drill string to the shaft 14 and ultimately to the drill bit (not shown) to aid in drilling. Generally, a single double acting thrust bearing 98 and its accompanying spacer arrangement is not sufficient to transfer the weight of the drill string to shaft 14 and ultimately the drill bit. A plurality of double acting thrust bearings 98, together with their accompanying spacer arrangements, are generally required, preferably arranged as shown in FIG. 3C. FIG. 3C depicts a preferred embodiment having a bearing arrangement which includes three double acting thrust bearings 98*a–c*, although a larger or smaller number of such bearings is also contemplated, depending on the weight of drill string to be supported.

In general terms, the life of ball bearings can be represented as $$\text{Bearing life} = (C/P)^3 \times (16667)/N$$

where N=the rpm of the shaft, C=the dynamic capacity of the bearing, and P=the equivalent load on the bearing. As can be seen, the bearing life increases as the decrease in load P to the power of three. The preferred bearing arrangement as shown in FIG. 3C reduces the load P on the individual bearings by transferring weight of the drill string equally among a plurality of double acting thrust bearings 98. Thus, the means for supporting the weight of a drill string also serves as means for preserving and prolonging the life of the bearings 98 associated with motor 70. It is also possible to increase bearing life by reducing rpms N. However, bearing life only increases linearly relative to rpm reduction.

The load on bearings 98 is reduced by the preferred bearing and spacer arrangement shown in FIG. 3C. Preferably, a shoulder 100 in housing 20 bears against self aligning bearing 102. A first double acting thrust bearing 98*a* is separated from self aligning bearing 102 by spacer 104, disc springs 106, and race 108. The opposite end of double acting bearing 98*a* is adjacent another race 110, which in turn bears against spacer 112. Spacer 112 rests against split spacer 114 which is held within a circumferential groove 116 in shaft 14. Split spacer 114 within groove 116 acts as a shelf on shaft 14, and serves to support weight of the drill string by transferring this weight to shaft 14, thereby reducing the load placed on bearings 98 and correspondingly increasing the lifetime of these bearings. Spacer 118 holds split spacer 114 in position within groove 116. Thrust bearing 120 abuts spacer 118 and is additionally held in place by spacer 122. Split spacer 124 resides in groove 126 in housing 20, and holds spacer 122 and thrust bearing 120 in position relative to housing 20. A second double acting thrust bearing 98*b* is separated from spacer 122 by disc springs 127 and race 129.

This arrangement of spacers, races, disc springs, and thrust bearings are repeated for second and third double acting thrust bearings 98*b*, 98*c*. The weight of the drill string is transferred to shaft 14 and ultimately to the drill bit by the split spacers 114 in grooves 116, which, as described above, act as shelves supporting the drill string weight.

Ultimately, the third double acting thrust bearing 98*c* is separated from self aligning bearing 128 by race 130, spacer 132, split spacer 134 in groove 136 of shaft 14, and spacer 138. Split spacer 134 in groove 136 also serves as a shelf, as described above, for supporting weight and reducing load on bearings 98. Self aligning bearing 128 then adjoins spacer 140 and thrust bearing 142, which in turn abuts spacer 144. Disc springs 146 separate spacer 144 from stuffing box 148, which is attached to housing 20. A plurality of packing rings 150 are mounted within stuffing box 148, and are held in place by packing gland 152. Packing gland 152 is coupled to stuffing box 148, and can be tightened to a predetermined torque and locked in place by lock nut 154. An elastomeric seal 156 prevents larger particulate contaminants from reaching packing rings 150. Seals 44 prevent any leakage from the packing rings from reaching any bearings. O-ring 52 is positioned between stuffing box and housing to prevent fluid leakage.

Shaft 14 includes keys or splines 160 adjacent shaft second end 18, which join shaft 14 to a bit sub 162. Set screws 164 engage grooves 166 in shaft 14 to anchor bit sub 162 to shaft 14. Alternatively, bit sub 162 may be an integral portion of shaft 14. Bit sub includes a tapered bore 168 with threads 170 for attachment to a drill bit.

The orifice motor 70 shown in FIG. 3A through FIG. 3D operates in the same general manner as the orifice motor embodiment 10. Orifice motor 70 is associated with a well drill string (not shown) which attaches to motor 70, preferably by threading onto adapter 82. Pressurized fluid enters input chamber 56, then travels through bore 27 in input nozzle 22 and through inlet ports 28. From inlet ports 28, fluid passes into a cavity 58 adjacent to rotor 12a and through orifices 50a of first rotor 12a, then to chamber 60a and through orifices 50b and so on, to cavity 62 from which the fluid travels out through exit ports 32 into exit chamber 34 and bit sub bore 168.

Generally, hydraulic motors will require more torque while the attached drill bit is engaged with the well bottom. Under conditions where the drill bit is off-bottom and thus disengaged, the attached hydraulic motor can run away, generating unwanted internal friction. Since torque is proportional to fluid input rate, the orifice motor comprising the present invention will preferably include a flow regulator (not shown) associated with the fluid inlet means, the flow regulator being actuated when weight on the drill bit is removed.

Since the orifice motors 10 and 70 include no dynamic elastomeric parts, as is the case in currently used downhole motors, it is suitable for use in hot well applications. The O-rings and seals in the orifice motor, which are well isolated from the dynamic portions of the motor, can be made from materials suitable for high temperature uses, such as filled or unfilled fluoropolymers (e.g., VITON® hexafluoropropylene) and the like.

Accordingly, it will be seen that this invention provides an orifice motor which is suitable for use at high temperatures such as drilling in hot wells, and is compact in length, thus permitting use for drilling in short radius holes. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An orifice motor comprising:
   (a) a longitudinal shaft, said shaft having a first end and a second end, said shaft including an inlet nozzle adjacent said first end, said shaft including an outlet chamber adjacent said second end, said inlet nozzle and said outlet chamber in flow communication;
   (b) a plurality of rotors, said rotors coupled to said shaft, each said rotor having at least one jet orifice means for ejecting fluid tangential to said rotor; and
   (c) a housing, said housing containing said shaft and said rotors.

2. An apparatus as recited in claim 1, further comprising friction reducing means for reducing friction between said shaft and said housing, said friction reducing means positioned between said shaft and said housing.

3. An apparatus as recited in claim 2, further comprising sealing means for sealing said friction reducing means and protecting said friction reducing means from contaminants contained in said fluid, said sealing means positioned between said shaft and said housing.

4. An apparatus as recited in claim 3, further comprising means for preventing pressurized fluid from bypassing said rotors.

5. An apparatus as recited in claim 4, wherein said rotors are fixedly coupled to said shaft by keys.

6. An apparatus as recited in claim 5, wherein said shaft includes support means for supporting the weight of a drill string.

7. An apparatus as recited in claim 6, wherein said support means includes means for transferring weight of a drill string to said shaft.

8. An orifice motor comprising:
   (a) a shaft, said shaft having a longitudinal axis extending between a first end and a second end, said shaft including an inlet nozzle adjacent said first end, said shaft including an outlet chamber adjacent said second end, said inlet nozzle and said outlet chamber in flow communication;
   (b) a plurality of spaced-apart rotors, each said rotor coupled to said shaft, each said rotor including a plurality of jet orifice means for ejecting fluid tangential to said rotor, each said jet orifice means positioned within a corresponding rotor offset at an angle relative to a reference line which is orthogonal relative to said longitudinal axis through said rotor; and
   (c) a housing, said housing containing said rotors and said shaft.

9. An apparatus as recited in claim 8, further comprising friction reducing means for reducing friction between said shaft and said housing, said friction reducing means positioned between said shaft and said housing.

10. An apparatus as recited in claim 9, further comprising sealing means for sealing said friction reducing means and protecting said friction reducing means from contaminants contained in said fluid, said sealing means positioned between said shaft and said housing.

11. An apparatus as recited in claim 10, further comprising means for preventing pressurized fluid from bypassing said rotors.

12. An apparatus as recited in claim 11, wherein said rotors are fixedly coupled to said shaft by keys.

13. An apparatus as recited in claim 12, wherein said shaft includes support means for supporting the weight of a drill string.

14. An apparatus as recited in claim 13, wherein said support means includes means for transferring weight of a drill string to said shaft.

15. An orifice motor comprising:

(a) a shaft having a longitudinal axis between a first end and a second end, said shaft including an inlet nozzle adjacent said first end, said shaft including an outlet chamber adjacent said second end, said inlet nozzle and said outlet chamber in flow communication;

(b) a plurality of spaced-apart rotors coupled to said shaft, each said rotor having a plurality of jet orifice means for ejecting fluid tangential to said rotor, said orifices in flow communication with each other, said orifices in flow communication with said inlet nozzle, said orifices in flow communication with said outlet chamber, said orifices offset at an angle relative to a reference line which is orthogonal relative to said longitudinal axis through said rotors;

(c) a housing, said housing containing said shaft and said rotors;

(d) friction reducing means for reducing friction between said shaft and said housing; and (e) sealing means for sealing said friction reducing means from contaminants contained in said fluid, said sealing means positioned between said housing and said shaft and adjacent to said friction reducing means.

16. An apparatus as recited in claim 15, further comprising means for preventing pressurized fluid from bypassing said rotors.

17. An apparatus as recited in claim 16, further comprising weight transfer means for transferring weight from a drill string to said shaft.

18. An apparatus as recited in claim 17, wherein said weight transfer means comprises a plurality of split spacers, each of said split spacers positioned within a groove in said shaft, each of said split spacers forming a weight-supporting shelf on said shaft, said each of said split spacers positioned adjacent to a double acting thrust bearing.

* * * * *